United States Patent [19]

McCullough, Jr. et al.

[11] Patent Number: 5,024,877
[45] Date of Patent: Jun. 18, 1991

[54] FIRE RESISTANT MATERIALS

[75] Inventors: Francis P. McCullough, Jr., Lake Jackson; R. Vernon Snelgrove, Damon, both of Tex.; David M. Hall, Auburn, Ala.

[73] Assignee: The Dow Chemical Company, Midland, Mich.

[21] Appl. No.: 479,828

[22] Filed: Feb. 14, 1990

Related U.S. Application Data

[63] Continuation-in-part of Ser. No. 337,912, Apr. 14, 1989, abandoned, which is a continuation-in-part of Ser. No. 114,324, Oct. 28, 1987, Pat. No. 4,879,168, which is a continuation-in-part of Ser. No. 206,634, Jun. 14, 1988, which is a continuation-in-part of Ser. No. 108,255, Oct. 13, 1987, Pat. No. 4,898,783.

[51] Int. Cl.$^5$ ............................................. D04H 1/16
[52] U.S. Cl. ...................................... 428/282; 428/280; 428/281; 428/283; 428/246; 428/247; 428/256; 428/266; 428/290; 428/408; 428/446; 428/447
[58] Field of Search ............... 428/446, 447, 408, 280, 428/281, 282, 283, 247, 256, 290, 920, 902, 266, 246

[56] References Cited

U.S. PATENT DOCUMENTS

| | | | |
|---|---|---|---|
| 3,811,997 | 5/1974 | Yuan | 161/68 |
| 3,914,494 | 10/1975 | Park | 428/247 |
| 4,173,490 | 11/1979 | Rotenberg et al. | 428/412 |
| 4,255,483 | 3/1981 | Byrd et al. | 428/245 |
| 4,308,371 | 12/1981 | Tanaka et al. | 528/18 |
| 4,315,091 | 2/1982 | Steinberger et al. | 528/28 |
| 4,642,664 | 2/1987 | Goldberg et al. | 357/2 |
| 4,814,017 | 3/1989 | Yoldas et al. | 106/287.12 |
| 4,837,076 | 6/1989 | McCullough et al. | 428/224 |
| 4,879,168 | 11/1989 | McCullough et al. | 428/224 |
| 4,897,303 | 1/1990 | McCullough, Jr. et al. | 428/284 |

Primary Examiner—James J. Bell

[57] ABSTRACT

A means for improving the fire resistance of carbonaceous polymeric substance comprising a non-graphitic carbonaceous polymeric material having an LOI value greater than 40, produces a char formation greater than 65% and a thermoconductivity less than 1 BTU ft/Hr ft$^2$°F. by utilizing an organosilicone polymer in an amount to provide ignition resistance. Also, there is provided a means for improving the fire resistance and thermal stability of resins and polymers.

36 Claims, No Drawings

FIRE RESISTANT MATERIALS

RELATED APPLICATION

This application is a continuation-in-part of application Ser. No. 337,912 filed Apr. 14, 1989, entitled "FIRE RESISTANT MATERIALS", now abandoned which is a continuation-in-part of application Ser. No. 114,324, filed Oct. 28, 1987 entitled "FLAME RETARDING AND FIRE BLOCKING FIBER BLENDS", now U.S. Pat. No. 4,879,168, application Ser. No. 206,634, filed June 14, 1988, entitled "FIRE SHIELDING COMPOSITE STRUCTURES", and application Ser. No. 108,255, filed Oct. 13, 1987, entitled "SOUND AND THERMAL INSULATION", of McCullough et al now U.S. Pat. No. 4,898,783.

FIELD OF THE INVENTION

The present invention relates to a means for synergistically improving the resistance to oxidation and thermal stability of carbonaceous polymeric materials. The invention also relates to improving the fire resistant properties of silicone resins or Si-containing polymers. More particularly, the invention is concerned with the articles prepared from the combination of an organosilicone polymer and a non-graphitic carbonaceous polymeric material having a char formation greater than about 65 percent, an LOI value greater than 40, and a thermal conductivity of the material in fiber form less than 1 BTU ft/Hr ft$^2$ °F. The organosilicone polymers can be used to provide a synergistic improvement in ignition resistant properties as defined by 14 CFR 25.853(b) of structures comprising carbonaceous polymeric materials without any substantial alteration of the desirable characteristic of the carbonaceous polymeric material On the other hand, the carbonaceous polymeric material can be used to enhance the fire resistance of organosilicone polymer structures.

BACKGROUND OF THE INVENTION

The use of carbonaceous materials for sound and thermal barriers is now known. The materials in the form of battings and mats are now being proposed for use in areas subjected to high temperatures and degrading gases, especially oxidizing gases.

It has been proposed to coat the carbonaceous fibers with ceramic and metallic materials to provide protection for the fibers against these oxidizing gases. However, such materials can be expensive, difficult to apply, add significant weight and can sometimes alter the low water retention properties of the structure. Furthermore, the resulting structure is relatively hard and does not have the flexibility or feel of the original fibers.

The prior carbonaceous materials have also been useful to provide a flame barrier. However, the flame barrier in many cases is effective only against static flames. There are occasions when it is desirable to provide protection against short periods of dynamic flames which are a result of pressure forces, wind velocities of the like. Such flames can cause physical erosion of a flame barrier.

K. Tanaka et al, U.S. Pat. No. 4,308,371 granted Dec. 29, 1981 and B. E. Yoldas et al, U.S. Pat. No. 4,814,017 granted Mar. 21, 1989, which are herewith incorporated by reference, disclose organoalkoxsilanes which may be used in the present invention.

E. L. Yuan, U.S. Pat. No. 3,811,997, granted May 21, 1974, discloses smoke and flame resistant structural articles for use in aircrafts. The articles can be of a laminate or a honeycomb construction. The articles are provided with a thin film of polyimine or polyamide to retard combustion of the underlying laminate and reduce smoke effusion from any burning that does occur.

I. K. Park, U.S. Pat. No. 3,914,494, granted Oct. 21, 1975, discloses a material for use, for example, as a facing sheet for a sandwich liner for noise suppression in a jet engine. The lightweight material includes woven carbon fibers in a resin matrix. The resin can be phenolic or a polyimide. Burning phenolic resins produce highly irritating smoke.

U.S. Pat. No. 4,642,664 to Goldberg et al, which is herewith incorporated by reference, discloses polyaromatic precursor and carbonaceous materials which may be used in the present invention.

U.S. Pat. No. 4,837,076 to McCullough et al, which is herein incorporated by reference, discloses a class of carbonaceous fibers which can be used in connection with the present invention.

U.S. Pat. No. 4,879,168 to McCullough et al, discloses the synergism of carbonaceous fibers blended with thermosetting resins with regard to fire resistance.

U.S. Pat. No. 4,255,483, to N. R. Byrd et al discloses an acoustic firewall for use in environments such as an aircraft engine nacelle. The firewall includes a graphite fiber or glass cloth embedded in a silica-containing polyimide resin. The presence of the silica is described as being necessary to provide the polyimide resin and the firewall with the desired stability in the presence of a fire and with low thermal conductivity.

The carbonaceous materials of the invention according to the test method of ASTM D 2863-77 have an LOI value greater than 40. The test method is also known as "oxygen index" or "limited oxygen index" (LOI). With this procedure the concentration of oxygen in $O_2/N_2$ mixtures is determined at which a vertically mounted specimen is ignited at its upper end and just continues to burn. The size of the specimen is 0.65×0.3 cm with a length from 7 to 15 cm. The LOI value is calculated according to the equation:

$$LOI = \frac{[O_2]}{[O_2 + N_2]}$$

The LOI values of different materials are as follows:

| | |
|---|---|
| polypropylene | 17.4 |
| polyethylene | 17.4 |
| polystyrene | 18.1 |
| rayon | 18.6 |
| cotton | 20.1 |
| nylon | 20.0 |
| polycarbonate | 22 |
| rigid polyvinyl chloride | 40 |
| stabilized polyacrylonitrile | >40 |
| graphite | 55 |

The carbonaceous materials of the invention can also be characterized by having a thermal conductivity of less than 1 BTU ft/Hr ft$^2$ °F.

The measurement of char formation as discussed herein is made using a standard thermogravimetric analysis apparatus that is adapted so as to perform the analysis in a nitrogen atmosphere. The apparatus is described in *Encyclopedia of Polymer Science,* Vol. 14, p. 21, John Wiley & Son, 1971, which is incorporated herein by reference.

The measurement is performed by loading a sample onto the sample pan of the thermogravimetric analysis apparatus. The sample is then heated in an nitrogen atmosphere at a rate of 10° C./min from ambient temperature to 900° C. The thermogravimetric apparatus records the sample weight remaining versus temperature.

The percent of original weight remaining at 800° C. is taken as the char percentage.

The percent char formation and thermal conductivities of different materials are as follows:

| | % Char | Conductivity ft/Hr/ft$^2$ °F. |
|---|---|---|
| Carbonaceous particles (18.6% N$_2$) of invention | >65 | 0.1 |
| Carbonaceous particles (16.0 N$_2$) of invention | >65 | 0.2 |
| KEVLAR | 60 | <1 |
| KODEL 410 polyester | 10 | <1 |
| Polyacrylonitrile | 60 | <1 |
| Oxidized polyacrylonitrile | 60 | <1 |
| THORNEL 300* carbon fiber | >95 | 4.84 |
| Cotton | >30 | <1 |
| Rayon | <50 | <1 |
| Polycarbonate | 22 | <1 |
| Polyethylene terephthalate | 10 | <1 |
| Carbon particles | >90 | 2.5 |
| THORNEL Graphite fiber P758** | >95 | 106.48 |

*1K/3K/6K/15K Carbon yarn of Amoco Corp., Danbury CT.
**2K/4K Carbon yarn derived from pitch of Amoco Corp., Danbury CT.

It is understood that the term "fire resistant" as used herein relates to any one of the characteristics of flame arresting, flame retarding, fire shielding and fire barrier.

An article is considered to be flame retarding to the extent that once an igniting flame has ceased to contact unburned parts of the textile structure, the article has the inherent ability to resist further propagation of the flame along its unburned portion, thereby stopping the internal burning process. Recognized tests to determine whether a textile article is flame retarding are, inter alia, the American Association of Textile Chemists and Colorists Test Method 34-1966 and the National Bureau of Standards Test described in DOC FF 3-71.

An article is considered to be "fire shielding" if it is capable of deflecting flames and the radiation therefrom in a similar manner as aluminum coated protective garments, which are known in the art.

Fire barriers have the capability of being non-flammable, flame retarding and providing thermal insulation characteristics.

The term "polymeric" used herein includes natural substances as well as other organic polymeric materials including organosilicone polymers.

"Static flames" as herein recited relates to flames which are subject to substantially little or no pressure, for example, match, candlestick or butane lighter flames.

"Dynamic flames" as herein defined relates to flames which are acting under a pressure such as disclosed in FAR 25.855 Appendix F.

The term "polymer" as used herein relates to the set or cured polymers which can be obtained from the silicone resins or the hydrolyzed partial condensation products of siloxanes such as manufactured by Dow Corning Corporation.

The term "silicone resin" as herein disclosed relates to any precursor material which is capable of being polymerized to form the organosilicone polymers of the invention. The silicone resins include but are not limited to oligomers derived typically by the partial hydrolysis of a silane. The oligomers generally have a backbone of siloxane units and active sites which may be cured thermally and/or hydrolytically to form the organosilicone polymer.

The resins further include the precursor silane compounds which are capable of forming organosilicone polymers through a free radical condensation reaction or a heat condensation reaction. Typically, the heat condensation and/or free radical condensation reactions are performed utilizing silanes having epoxy or vinyl moieties.

The term "reinforcement scrim" relates to metallic, glass or fibrous structures which are woven, nonwoven, knit, or the like, that are utilized to provide a mechanical or physical reinforcement to structures against dynamic forces. The term includes composite structures containing unidirectional fibers.

The term "carbonaceous fibers" as used herein relates to polymeric fibers whose carbon content has been irreversibly increased as a result of a chemical reaction such as a heat treatment, as disclosed in U.S. Pat. No. 4,837,076.

The term "non-graphitic" as used herein relates to those carbonaceous materials having an elemental carbon content of less than 92 percent (%), which are substantially free of oriented carbon or graphite microcrystals of a three dimensional order, and as further defined in U.S. Pat. No. 4,005,183, which is herein incorporated by reference.

It should be understood that the term "particles" as used herein is intended to include powders, platelets, and the like.

The non-linear carbonaceous fibers preferably used in the invention are resilient, shape reforming and have a reversible deflection greater than about 1.2:1. It should be understood that the reversible fiber deflection comprises two components, pseudoelongation and fiber elongation. Pseudoelongation results from the non-linear configuration and/or false twist imposed on the fiber. Fiber elongation is the elongation to fiber break after the fiber has been made linear.

All percentages referred to herein are in percentage by weight.

SUMMARY OF THE INVENTION

The present invention relates to an ignition resistant structure comprising the combination of a non-flammable non-graphitic carbonaceous material having an LOI value greater than 40, a char formation greater than about 65% and a thermal conductivity of the carbonaceous material being less than 1 BTU ft/Hr ft$^2$ °F., and an organosilicone polymer which is characterized by the following recurring units:

$$(Si-O-Si-O)_n$$

The organosilicone polymer is present in the structure in an amount sufficient to impart ignition resistance to the structure.

The organosilicone polymers utilized in the invention are the known organosilicone polymers which are prepared from precursor silicone resins by a hydrolysis, heat condensation, or free radical condensation reaction. Preferred organosilicone polymers are those which can be prepared by setting or curing a compound selected from the group consisting of the hydrolyzed partial condensation product of $R_xSi(OR')_{4-x}$ and $R_xSi(OOR')_{4-x}$, wherein R is an organic radical and R' is a lower alkyl or phenyl radical, and x is at least 1 and less than 4. The amount of organosilicone polymer utilized is about at least in an amount to provide ignition resistance. Generally, 0.5 to 90% by weight of the organosilicone polymer is used depending on the characteristic of the structure desired.

Preferably, R is selected from the group consisting of lower alkyl, alkenyl, substituted alkyl and aryl. The preferred aryl is phenyl.

These organosilicone polymers may be obtained by thermosetting or curing a silicone resin by means of a catalyst. Other suitable silicone resins are mentioned in the Dow Corning Corp. brochure entitled "Information about High Technology Materials", 1986. Preferred silicone resins are the hydrolyzed partial condensation products of trimethoxymethylsilane, methoxytrimethylsilane, dimethoxy dimethyl silane, and the like.

The organosilicone polymers are preferably utilized in amounts of up to about 50% by weight of the carbonaceous material or higher. However, amounts of organosilicone polymer between about 0.5 to 20% have resulted in desirable results in enhancing the ignition resistance, fire resistance and resistance to oxidation of most carbonaceous materials and/or protection of the materials, particularly fiber, while maintaining the favorable characteristics of the materials.

The carbonaceous materials can improve the fire resistance and stabilize a structure primarily comprising a cured or set organosilicone polymer. A surface coating of carbonaceous polymeric material provides an effective flame barrier. Distribution of fibers throughout an organosilicone polymer structure improves the fire resistance of the structure on the whole. Preferably the structure contains the carbonaceous polymeric material along its surface as either fibers, particles, platelets, foams, films, or the like.

In accordance with one embodiment of the invention, there is provided a flame barrier and fire resistant structure of carbonaceous fibrous material for dynamic flames.

Advantageously, carbonaceous fibers and/or particles or platelets are intimately blended with the organosilicone polymer at least at the surface of the structure. The structure can comprise at least one structural panel of a compression formed composite of a thermoplastic or thermosetting resin matrix containing about 10 to 95% by weight of said non-flammable carbonaceous fibers and/or particles and a synergistic amount of said organosilicone polymer to impart ignition resistance. The panel can be used in combination with a reinforcement scrim comprising, for example, a woven or knitted carbonaceous fabric, carbonaceous web, carbonaceous foam or a metallic screen or glass screen. Preferably, the carbonaceous fabric or web is treated with said silicone resin. The structure, in combination with a reinforcement scrim, provides a flame barrier against a dynamic flame such as described in FAR 25.855 Appendix F. The structure can be used to provide a flame barrier in aircraft or land or marine vehicles.

The carbonaceous structures of the present invention provide an improvement over fiberglass structures which utilize phenolic binders. The improvement includes an advantage in weight as well as in smoke characteristics.

It is therefore an object of the invention to provide a means for protecting carbonaceous articles against degrading gases.

It is further object of the invention to provide a flame barrier against dynamic and impinging flames.

It is yet still further object to provide structural panels for aircraft which can form a flame barrier.

Other objects and advantages, including obvious modifications and adaptations, will be apparent to those of ordinary skill in the art from the description of the preferred embodiments.

DETAILED DESCRIPTION OF THE PREFERRED EMBODIMENTS

In the broadest aspects of the present invention, there is provided an improvement in the fire resistance and oxidation resistance at high temperatures of carbonaceous materials. There is further provided an improvement in thermal resistance of organosilicone polymer structures.

In accordance with one embodiment, the invention is directed to a composite which comprises a synthetic resin, such as a thermoplastic or thermosetting resin, that is compressed together with a batting of the aforementioned non-flammable carbonaceous fibers and/or particles. Prior to compression, the batting is treated with an organosilicone polymer in an amount to provide ignition resistance. Generally, there is utilized up to about 20%, preferably about 10% by weight of a polymerizable silicone resin of the invention. Such a composite will be useful, particularly in forming fire resistant or flame shielding structural panels, for use in vehicles and installations, particularly airplanes.

Advantageously, the composites of the present invention contain about 10 to 90% by weight non-flammable carbonaceous material, preferably fibers having an aspect ratio (length/diameter (l/d)) of greater than 10:1. In a preferred embodiment, the carbonaceous fibers are non-linear and possess a sinusoidal or coil-like configuration or a more complicated structural combination of the two. About 10 to 90% by weight of the carbonaceous materials are used in fabricating the composite, preferably about 20–75% by weight of composite. The synthetic resin used in the composites of the present invention can be selected from any of the conventional type resin materials such as thermoplastic resins and thermosetting resins.

Thermoplastic resins, for example, can include polyethylene, ethylenevinyl acetate copolymers, polypropylene, polystyrene, polyvinyl chloride, polyvinyl acetate, polymethacrylate, acrylonitrile-butadiene-styrene copolymers (ABS), polyphenylene oxide (PPO), modified PPO, polycarbonate, polyacetal, polyamide, polysulfone, polyether sulfone, polyolefins, polyacrylonitrile, polyvinylidene chloride, polyvinyl acetate, polyvinyl alcohol, polyvinyl pyrrolidone, ethyl cellulose, polyvinyl chlorodivinyl acetate copolymer, polyacrylonitrile-styrene copolymer, polyacrylonitrile-vinyl chloride copolymer, carboxymethylcellulose, polyparaxylene, polyimide, polyamideimide, polyester imide, polybenzimidazole, polyoxadiazole, and the like.

Thermosetting resin, for example, can include phenolic resins, polysiloxanes, urea resin, melamine resin, alkyl resin, vinyl ester resins, polyester resin, xylene resins, furanic resins, and the like. The thermosetting resins also include the organosilicones used to provide the improved fire resistant effect.

Other suitable resinous materials are disclosed in *Modern Encyclopedia*, 1984–85, Vol. 61, No. 10A, McGraw-Hill, New York, N.Y., which is herewith incorporated by reference.

A panel of the invention in its simplest form comprises a heat cured panel member comprising a resin matrix which contains an organosilicone polymer of the invention with carbonaceous fibers and a plastic or metallic film which can form a vapor barrier or decorative cover. The film can be compressed onto the panel during the compression forming operation. Optionally, carbonaceous particles or platelets can be added.

The invention provides a structure which is particularly useful as a panel for the interior of airplanes. The structure comprises at least one resinous matrix having 20–50% by weight of non-linear carbonaceous fibers incorporated therein that is formed by heat and pressure application. On its upper surface a plastic film, which is preferably MYLAR, is attached. The film advantageously can be provided with a decorative embossment. On the other side of the matrix, there can be provided a reinforcement scrim which can be in the form of a screen, grate, or web of carbonaceous material. The screen can be metallic, i.e. nickel, steel, Pyrex glass, an organosilicone polymer composite containing unidirectional fibers, and the like.

A fluff of non-linear and/or linear carbonaceous fibers which is covered by a foil can be provided when thermal and sound insulation are desirable.

A fluff of non-linear and/or linear carbonaceous fibers which is covered by a foil can be provided when thermal and sound insulation is desirable.

The panel can be prepared by enclosing a fluff of carbonaceous fibers between sheets of plastic material, heating to the softening point and subjecting the mixture to compressive forces depending upon the thickness desired and the utilization contemplated.

The resinous matrix as well as the thermal and sound insulating materials can contain biostabilizers such as tributyl tin and its derivatives, copper-bis(8-hydroxyquinoline), and the like.

The preferred resin for forming airplane panel structures are the commercial polyesters such as, for example, the polyester fibers sold by Eastman Chemical Products under the trademark KODEL 410, 411, 432 and 435, and DACRON 262 and 124W of E. I. du Pont de Nemours.

Briefly, the carbonaceous fibers of this invention are prepared by heat treating in an inert atmosphere a suitable stabilized or oxidized precursor polymeric fiber which can be made into an irreversibly heat set, fiber or filament without tension or stress. Preferably, the stabilized precursor material used in the present invention is derived from stabilized staple polyacrylonitrile (PAN) filaments.

Polymeric precursor materials such as stabilized acrylic filaments which are advantageously utilized in preparing the carbonaceous fibers of the invention are selected from one or more of the following: acrylonitrile homopolymers, acrylonitrile copolymers and acrylonitrile terpolymers. The copolymers preferably contain at least about 85 mole percent of acrylonitrile units and up to 15 mole percent of one or more monovinyl units of styrene, methylacrylate, methyl methacrylate, vinyl chloride, vinylidene chloride, vinyl pyridine and the like copolymerized therewith. The acrylic filaments can also comprise terpolymers wherein the acrylonitrile units are at least about 85 mole percent.

The preferred precursor materials are typically prepared by melt spinning, dry or wet spinning the precursor materials in a known manner to yield a monofilament or multifiber tow. The fibers, yarn or tow are then heated to a temperature and for a period of time as described in Pat. No. 4,837,706.

In the case of polyacrylonitrile based fibers, the fibers can be formed by conventional methods such as by melt, dry or wet spinning a suitable liquid of the precursor material. The polyacrylonitrile (PAN) based fibers which have a normal nominal diameter of from 4 to 25 micrometers are collected as an assembly of a multiplixity of continuous filaments in tows. The fibers are then stabilized, for example by oxidation or any other conventional method of stabilization. The stabilized fibers, tows or staple yarn which are typically made from chopped or stretch broken fiber staple are thereafter heat treated according to the present invention, in a relaxed and unstressed condition, at elevated temperatures in an inert non-oxidizing atmosphere for a period of time to produce a heat induced thermoset reaction. A nitrogen content of between about 5 to 35% is maintained. At a temperature range of from 150° C. to 525° C. and above, the fibers are generally provided with a substantially permanent or irreversible heat set.

It is to be understood that the fiber, tow or yarn may be initially heat treated at the higher range of temperatures so long as the heat treatment is conducted while the fiber is in a relaxed or unstressed state and under an inert, non-oxidizing atmosphere including under a reduced pressure atmosphere.

As a result of the higher temperature treatment of 525° C. and above, a substantially permanently or irreversible heat set is imparted to the fibers, yarns or tows. The resulting yarns, tows or fibers may be used per se or form a wool-like fluff. Such wool-like fluff has a bulk density of from 2.4 to 32 kg/m$^3$. A number of methods known in the art can be used to create a fluff or batting-like body of considerable loft.

The precursor stabilized linear polymeric fibers are prepared from well known materials such as pitch (petroleum or coal tar), polyacetylene, acrylonitrile based materials, e.g., a polyacrylonitrile copolymer such as GRAFIL-01 TM (trademarks of E. I. du Pont de Nemours & Co.), polyphenylene, polyvinylidene chloride polyaromatic amides (KEVLAR ® a trademark of E. I. du Pont de Nemours & Co.), polybenzimide, resin, SARAN TM (trademark of The Dow Chemical Company), and the like.

The carbonaceous fibers derived from polyacrylonitrile based materials which can be utilized in the invention are classified into three groups.

In a first group, the carbonaceous fibers have a carbon content of greater than 65% but less than 85%, are electrically nonconductive, and do not possess any electrostatic dissipating characteristics, i.e., they are not able to dissipate an electrostatic charge.

The term electrically nonconductive as utilized in the present invention relates to a resistance of greater than $4 \times 10^6$ ohms/cm ($10^7$ ohms/in) when measured on a 6K (6000 filaments) tow of individual fibers having a diameter of from 4 to 20 microns.

When the fiber is a stabilized and heat set polyacrylonitrile based fiber, it has been found that a nitrogen content of about 18% or higher results in an electrically nonconductive fiber.

When linear carbonaceous fibers are being utilized in the invention it is preferably that the fibers having the electrical characteristics of the first group. The preferred linear fibers also have a fiber elongation of about 3 to 9% and a tenacity of about 2 to 6 grams/denier (g/d).

In a second group, the carbonaceous fibers are classified as being partially electrically conductive (i.e., having a low conductivity) and having a carbon content of greater than 65% but less than 85%. The percent nitrogen content of such fibers is generally 16 to 20%. Low conductivity means that a 6K tow of fibers in which the individual precursor fibers have a diameter of from 4 to 20 micrometer, has a resistance of from $4 \times 10^6$ to $4 \times 10^3$ ohms/cm ($10^7$–$10^4$ ohms/in).

When linear fibers of this group are utilized in the invention, it is preferable that the fibers also have a fiber elongation of about 3 to 6% and a tenacity of from about 3 to 7 g/d.

In a third group are the fibers having a carbon content of at least 85 percent but less than 92% and a nitrogen content of at least 5%. These fibers are characterized as having a high electroconductivity. That is, the fibers have an electrical resistance when measured on a 6K tow of less than $4 \times 10^3$ ohms/cm ($10^4$ ohms/in).

The carbonaceous fibers of the present invention may be blended with other synthetic or natural fibers. Examples of such other fibers that may be used include other carbonaceous or carbon fibers, cotton, wool, polyester, polyolefin, nylon, rayon, glass fibers, fibers of silica, silica alumina, potassium titanate, silicon carbide, silicon nitride, boron nitride, boron, acrylic fibers, tetrafluoroethylene fibers, polyamide fibers, vinyl fibers, protein fibers, ceramic fibers such as aluminum silicate, and oxide fibers such as boron oxide, thoria and zirconia.

The mats or battings of carbonaceous fibers may also be provided with platelets or particles or suitable silicates, such as the alkaline earth or alkaline metal silicates, to further improve their fire resistance performance.

When two battings are provided of carbonaceous fibers that comprise a different denier size for each batting, the battings may be readily joined together by a phenomenon similar to the VELCRO "hook and eye" effect.

Many composites and structures prepared from the combination of the invention are possible. The compositions prepared for a specific application will depend on the mechanical properties desired by the end-user. Generally, it has been found that fiber and/or particle loadings between 10 and 75% by weight are preferably for preparing flexible panels, in combination with the binder resins and/or organosilicone polymer or resin.

Exemplary of the structure of the present invention are those set forth in the following examples.

Example 1

A. Battings were made by blending an appropriate percentage of each respective opened fiber in a blender/feed section of a sample size 30 cm Rando Webber Model B (manufactured by Rando Machine Corp. of Macedon, N.Y.). The fibers had an LOI greater than 40, a specific resistivity greater than $10^{-2}$ ohm-cm and a coefficient of emissivity between 0.75 and about 1. The battings thus produced typically were about 2.5 cm thick and had a bulk density in the range of from 6.4 to 96 kg/m$^3$. The battings were thermally bonded by passing on a conveyor belt through a thermal bonding oven at a temperature of about 300° C.

B. To produce a flexible panel the batting of part A was sprayed with Dow Corning 1-2577 conformal coating ( a hydrolyzed partial condensation of trimethoxy methyl silane) until 10% by weight of the coated batting comprised the coating. The coated batting was compressed on a platen between two vinyl sheets at 25 lb/sq. in. at a temperature of 260° F.

In lieu of the conformal coating, a silicone resin, which is polymerizable by either a heat condensation or a free radical condensation may be utilized.

Example 2—Ignition Resistance Test

The ignition resistance of the panels of the invention was determined following the test procedure set forth in 14 CFR 25.853(b). The test was performed as follows:

A minimum of three battings of 2.5 cm × 15 cm × 30 cm specimens comprised of 80% carbonaceous fiber and 20% polyester were prepared. The battings were sprayed with a solution of Dow Corning 1-2577 conformal coating (a hydrolyzed partial condensation of trimethoxy methyl silane) which cures by contact with moisture in air. The sprayed battings were compressed at 25 lb/in.$^2$ at 260° F. to produce flexible panels. The coating comprised 10% by weight of the panels.

Standard vertical burn tests according to FAR 25.853b were conducted. The panels were conditioned by maintaining the specimens in a conditioning room maintained at temperature of 21° C.±5° C. and 50%±5% relative humidity for 24 hours preceding the test. Each specimen was supported vertically and exposed to a Bunsen or Turill burner with a nominal I.D. tube adjusted to give a flame of 3.8 cm in height. The minimum flame temperature measured by a calibrated thermocouple pyrometer in the center of the flame was 843° C. The lower edge of the specimen was 1.9 cm above the top edge of the burner. The flame was applied to the center line of the lower edge of the specimens for 12 seconds and then removed. The material passed the test.

The material is said to pass the test if the material was self-extinguishing, the average burn length did not exceed 20 cm, the average after-flame did not exceed 15 seconds, and there were no flame drippings.

Example 3

A. A polyurethane foam 3"×3"×1 was covered with a panel from Example 1 except that the panel was free of any organosilicone polymer. The foam was subjected to the vertical burn test according to Example 2. At the conclusion of the test the polyurethane did not drip or burn, however, there was noted scorch and degradation of the polyurethane where the flame was located.

B. A test was run similar to Part A except that a panel of Example 1 was utilized which contained the organosilicone polymer. The polyurethane showed no signs of degrading and there was slight discoloration.

Example 4

Following the procedure of FAR 25.855 Appendix F entitled "Test Method to Determine Flame Penetration Resistance of Cargo Compartment Liners", which is herein incorporated by reference, a specimen was prepared which comprised a pair of panels prepared according to Example 1 with a scrim of a plain weave woven fabric (6 oz/yd$^2$) of carbonaceous fibers compressed therebetween. The fabric was sprayed so as to contain 10% of Dow Corning 1-2577 conformal coating. A fluff of 77% carbonaceous fibers and 23% polyester was placed in the bottom layer of the panel which was subjected to a flame with an air velocity before ignition set between 10-20 mph. After 5 minutes the thermocouple on the top side of the panel reached a maximum temperature of 120° F. There was erosion noted where the flames hit the fluff.

The weight of the panels and scrim was 122 g and the fluff was 40 g. The panels and fluff measured 16"×24".

Example 5

A. Following the procedure of Example 4, a specimen was prepared from a pair of panels having a scrim of plain weave woven fabric (6 oz/sq yd) compressed there between, and a fluff of carbonaceous fibers on the top. The panels, scrim, and fluff measured 16×24 in and had no organosilicone polymer. The total weight of the structure was 150 g.

The specimen, when subjected to the flame treatment eroded and failed the test after 4.25 min.

B. The experiment of Part A was performed, except the panels and scrim were treated with the Dow Corning conformal coating. The total weight of the specimen was 154 g.

The specimen, when subjected to the flame treatment for 5 min., passed the test. The final test temperature reached 236° F.

It should be understood that the examples demonstrate that the structures of the invention at relatively low masses are capable of coming well within the temperature requirements of FAR 25.855. Also, that further reduction of the masses is possible without exceeding the test temperature requirement of up to 400° F.

Example 6

A specimen similar to that of Example 2 was prepared except that it contained 20% carbonaceous fiber, 10% conformal coating and 70% polyester. The specimen was placed in the National Bureau of Standards (NBS) smoke chamber and tested according to ASTM 662 with a radiant energy of 2.5 watts/cm$^2$. For smoldering and flaming conditions the specific optical density, $D_s$, defined by $D_s = 132 \log(100\% \text{ T})$, where T is the light transmission at time t, was very low. At two minutes $D_s$ was less than 10 in the smoldering case and less than 15 in the flaming case.

The smoke given off was basically from the polyester in the batting. The $O_2$, CO and $CO_2$ content of the smoke was analyzed by gas chromatography and the analysis is shown in the following table.

Smoke analysis in NBS Smoke Chamber as percent change from standard air concentrations

|  | Smoldering | Flaming |
| --- | --- | --- |
| Carbon Dioxide | 0.010% | 0.327% |
| Oxygen | −0.046% | −0.451% |
| Nitrogen | 0.037% | 0.125% |

A Drager gas detector tube was used to test for hydrogen cyanide in the smoke. None was detected down to a level of 2 ppm. Also investigated was the off gas produced during heating of carbonaceous fiber by thermogravimetry/mass spectrometry. The heating was performed from 30° C. to 1100° C. at 20° C./min in a 5.6% $O_2$ in a helium atmosphere. A first drop in weight which was noted was due to the evolution of physisorbed water. The fibers began to lose a large amount of weight at 550° C. and were totally pyrolyzed by 900° C. The major oxidative degradation product was $CO_2$ with substantial evolution observed between 375° C. and 900° C. Lesser amounts of $H_2O$, evolved between 30° C. and 215° C. and again above 350° C., and NO evolved between 500° C. and 700°. There were indications of a little ammonia being evolved between 530° C. and 890° C., but this could not be confirmed. No HCN was detected by mass spectrometry, nor were any of the standard gases of concern in the aircraft industry.

Example 7

Flame Barrier Test

A test was performed on a 24"×24" sample batting of approximately 14 oz/sq yd produced on a Rando Webber Model B. The sample was pressed at minimal pressure and was approximately ½ inch thick. The sample was placed on a ¼ inch steel plate with a thermocouple (t.) adjacent the sample and a thermocouple (t$_2$) adjacent the backside of the plate. The sample was exposed to a large propane/air burner, 500,000 Btu/hr. The test requirements was that after 30 minutes t$_2$ is less than 450° F. The results after 40 minutes is shown in the following table:

| time (min.) | t. flame temp. near front surface F° | t$_2$ steel plate temperature F° |
| --- | --- | --- |
| 0 + 30 sec. | 2180 | 73 |
| 5 | 2230 | 156 |
| 10 | 2235 | 202 |
| 20 | 2238 | 266 |
| 30 | 2235 | 303 |
| 40 | 2240 | 316 |

The sample was composed of 81% carbonaceous non-linear fibers heat treated at 650° C. with a fiber diameter about 10.8 microns, 9% Kodel 410 polyester binder fiber (8.5 denier, 1.5" staple) and 10% Dow Corning Silicone Resin No. 805.

What is claimed is:

1. An improved ignition resistant structure comprising the combination of a non-graphitic carbonaceous material having an LOI value of greater than 40, a char formation greater than about 65% and a thermal conductivity of the material in fiber form less than 1 BTU ft/Hr ft$^2$ °F. with about 0.5 to 90% by weight of an organosilicone polymer comprising the following recurring units: $(Si-O-Si-O)_n$ in an amount to provide ignition resistance to said structure.

2. The structure of claim 1 wherein said organosilicone polymer is derived from a hydrolysis reaction.

3. The structure of claim 1 wherein said organosilicone polymer is derived from a heat condensation reaction.

4. The structure of claim 1 wherein said organosilicone polymer is derived from a free radical condensation reaction.

5. The structure of claim 1 wherein said organosilicone polymer is thermoset.

6. The structure of claim 1 comprising about 5 to 10% by weight of said organosilicone polymer in intimate admixture with said carbonaceous material.

7. The structure of claim 1 wherein said carbonaceous material is derived from an oxidation stabilized acrylic material.

8. The structure of claim 7 wherein said acrylic material is selected from the group consisting of homopolymers, copolymers and terpolymers of acrylonitrile.

9. The structure of claim 7 wherein said carbonaceous polymeric material has a nitrogen content of about 5 to 35%.

10. The structure of claim 7 wherein said carbonaceous polymeric material has a nitrogen content of about 16 to 20%.

11. The structure of claim 1 wherein said carbonaceous materials is derived from a non-acrylic substance.

12. The structure of claim 1 wherein said carbonaceous material is in particle, film or foam form.

13. The structure of claim 1 wherein said carbonaceous material is in fiber form.

14. The structure of claim 13 wherein said fibers are linear.

15. The structure of claim 13 wherein said fibers are nonlinear.

16. An improved ignition resistant structure comprising the combination of a non-graphitic carbonaceous material having an LOI value of greater than 40, a char formation greater than about 65% and a thermal conductivity of the material in fiber form less than 1 BTU ft/Hr ft$^2$ °F. with about 0.5 to 90% by weight of an organosilicone polymer derived from the hydrolyzed partial condensation product of a compound selected from the group consisting of $R_xSi(OR')_{4-x}$ and $R_x Si(OOR')_{4-x}$, wherein R is an organic radical and R' is a lower alkyl or phenyl radical, and x is at least 1 and less than 4, said organosilicone polymer being present in an amount to provide ignition resistance to said structure.

17. The structure of claim 16 wherein R is selected from the group consisting of lower alkyl, alkenyl, substituted alkyl and aryl.

18. The structure of claim 16 wherein R and R' are lower alkyl.

19. The structure of claim 18 wherein R and R' are methyl.

20. The structure of claim 16 wherein R is lower alkyl and R' is phenyl.

21. The structure of claim 16 wherein said compound is selected from the group consisting of trimethoxymethylsilane and trimethoxyphenylsilane.

22. A flame barrier and fire resistant structure comprising
A. At least one structural panel comprising a compression formed composite composed of a thermoplastic or thermosetting resin matrix containing about 10 to 95% by weight of non-flammable non-graphitic carbonaceous fibers having an LOI value of greater than 40 and an aspect ratio (l/d) greater than 10:1, said structural panel being in intimate association at least on one surface with a synergistic amount of organosilicone polymer having the following recurring units:
(Si—O—Si—O)$_n$ to provide ignition resistance to said structure on said surface, and
B. A reinforcement scrim.

23. A structure of claim 22 wherein said organosilicone polymer is derived from the hydrolyzed partial condensation product of a compound of the general formula

wherein R is an organic radical, R' is a lower alkyl or phenyl radical, and x is at least 1 and less than 4.

24. The structure of claim 23 wherein x is 1 or 2.

25. The structure of claim 23 wherein R is selected from the group consisting of lower alkyl, alkenyl, substituted alkyl and aryl.

26. The structure of claim 23 wherein R and R' are lower alkyl.

27. The structure of claim 22 wherein said scrim is compressed between a pair of panels.

28. The structure of claim 22 wherein said scrim comprises a carbonaceous fabric.

29. The structure of claim 22 wherein said scrim contains said organosilicone polymer.

30. The structure of claim 22 wherein said polymer is thermoset.

31. The structure of claim 22 wherein said panel comprises fibers having resilient shape reforming elongated non-linear nonflammable carbonaceous fibers, said fibers having a reversible deflection ratio of greater than 1.2:1 and an aspect ratio (l/d) of greater than 10:1.

32. The structure of claim 22 wherein said fibers are in the form of a batting prior to compression.

33. The structure of claim 22 including a batting of nonlinear carbonaceous fibers on at least one surface.

34. The structure of claim 22 wherein said organosilicone polymer is derived from a hydrolysis reaction.

35. The structure of claim 22 wherein said organosilicone polymer is derived from a heat condensation reaction.

36. The structure of claim 22 wherein said organosilicone polymer is derived from a free radical condensation reaction.

* * * * *